United States Patent [19]
Rochester

[11] Patent Number: 5,264,909
[45] Date of Patent: Nov. 23, 1993

[54] MEASUREMENT OF OPTICAL FIBER DIAMETER

[75] Inventor: James R. Rochester, Tucson, Ariz.

[73] Assignee: Hughes Aircraft Company, Los Angeles, Calif.

[21] Appl. No.: 796,284

[22] Filed: Nov. 22, 1991

[51] Int. Cl.$^5$ .................................................. G02B 11/10
[52] U.S. Cl. .................................. 356/73.1; 250/560; 356/385
[58] Field of Search ...................... 356/73.1, 385, 386, 356/429, 238; 250/560

[56] References Cited

U.S. PATENT DOCUMENTS

| | | | |
|---|---|---|---|
| 2,991,685 | 7/1961 | Van Dongeren | 356/238 X |
| 3,874,798 | 4/1975 | Antonsson et al. | 356/386 |
| 3,947,129 | 3/1976 | Wiklund | 356/429 X |
| 4,511,253 | 4/1985 | Glockner et al. | 356/429 X |
| 4,847,509 | 7/1989 | Millet et al. | 356/386 X |
| 4,924,087 | 5/1990 | Bailey et al. | 356/73.1 |
| 4,955,720 | 9/1990 | Blecha et al. | 356/429 |

FOREIGN PATENT DOCUMENTS

| | | | |
|---|---|---|---|
| 52-37063 | 3/1977 | Japan | 356/385 |
| 59-34104 | 2/1984 | Japan | 356/385 |
| 1497452 | 7/1989 | U.S.S.R. | 356/73.1 |

*Primary Examiner*—Vincent P. McGraw
*Attorney, Agent, or Firm*—Randall M. Heald; Charles D. Brown; Wanda K. Denson-Low

[57] ABSTRACT

The diameter of an optical fiber (36) moving past a measurement apparatus (20) is evaluated in a time of less than about 50 microseconds, permitting closely spaced individual measurements along the length of the optical fiber (36). The measurement apparatus (20) includes a number of discrete, stationary light sensors (22) arranged in a linear array (24), a light source (28) positioned to shine a beam of light (34) into the sensors (22) of the array (24), and a lens (38) that directs an enlarged image of the optical fiber (36) onto the array (24) of light sensors (22). The light sensors (22) each produce an output signal (26) responsive to the intensity of light reaching the sensor (22). The number of light sensors (22) having a signal below a threshold value at a selected moment is counted as a measure of the diameter of the portion of optical fiber (36) then lying between the light source (28) and the array of optical sensors (22).

6 Claims, 3 Drawing Sheets

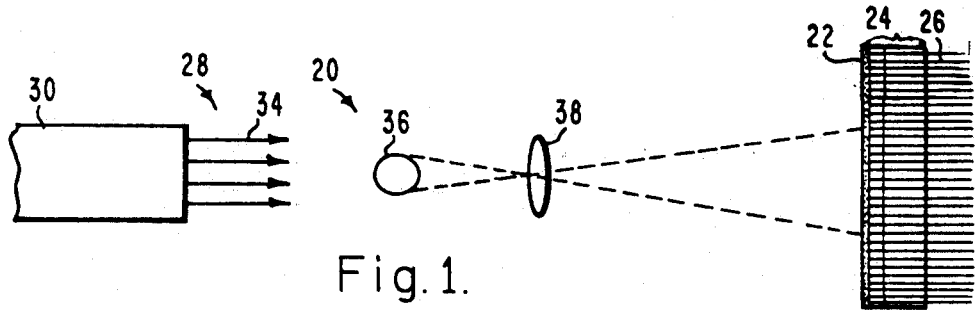
Fig. 1.
Fig. 2.
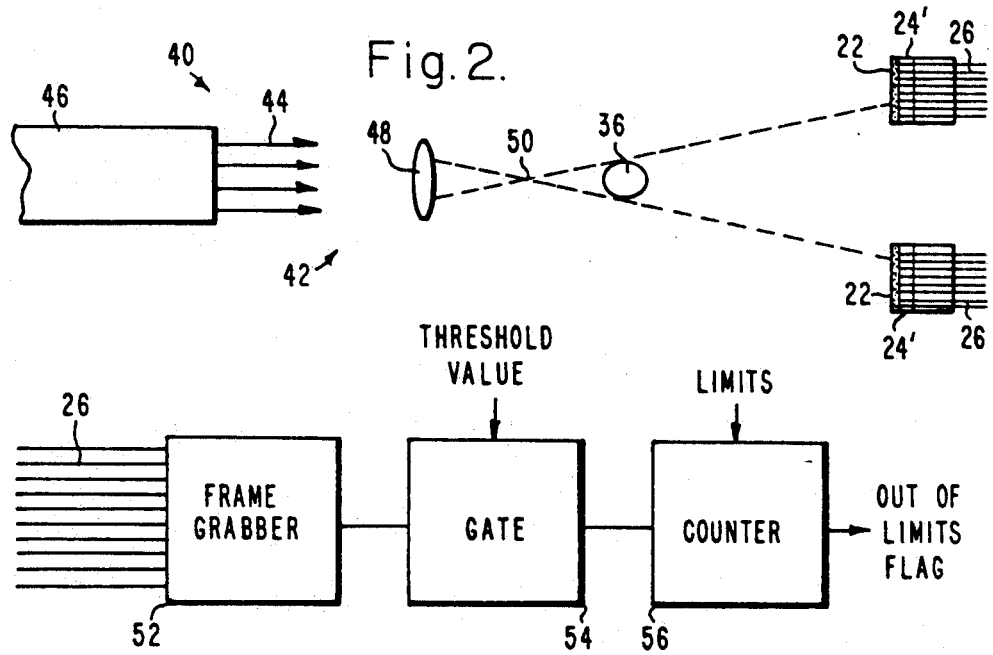
Fig. 3.
Fig. 4.
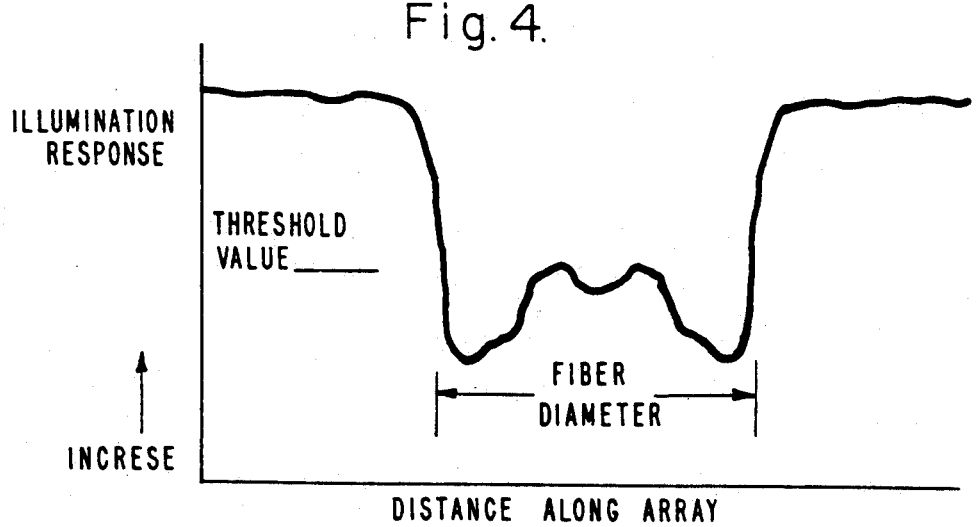

MEASUREMENT OF OPTICAL FIBER DIAMETER

BACKGROUND OF THE INVENTION

This invention relates to measurements of the diameter of an optical fiber, and, more particularly, to an apparatus and method for performing such measurements along the length of a rapidly moving optical fiber.

Glass fibers for optical information transmission are strands of glass fiber processed so that light transmitted through the fiber is subject to total internal reflection. A large fraction of the incident intensity of light directed into the glass fiber is received at the other end of the fiber, even though the glass fiber may be hundreds or thousands of meters long. Optical-quality glass fibers have shown great promise in communications applications, because a high density of information may be carried along the glass fiber and because the quality of the signal is less subject to external interferences of various types than are electrical signals carried on metallic wires. Moreover, the glass fibers are light in weight and made from a plentiful substance, silicon dioxide.

The glass fibers are fabricated by preparing a preform of glasses of two different optical indices of refraction, one inside the other, and processing the preform to a fiber. The optical glass fiber is coated with a polymer layer termed a buffer to protect the glass from scratching or other damage, and the resulting coated glass fiber is generally termed an "optical fiber" in the art. As an example of the dimensions, in a typical configuration the diameter of the glass fiber is about 125 micrometers, and the diameter of the glass fiber plus the polymer buffer (the optical fiber) is about 250 micrometers (approximately 0.010 inches).

The optical fiber may be wound onto a cylindrical or tapered cylindrical bobbin with many turns adjacent to each other in a side by side fashion. After one layer is complete, another layer of fiber is laid on top of the first layer, and so on. The final assembly of the bobbin and the wound layers of optical fiber is termed a canister, and the mass of wound optical fiber is termed the fiber pack. When the optical fiber is later to be used, the optical fiber is dispensed from the canister in a direction generally parallel to the axis of the cylinder.

The preparation of a canister demands great care and precision in winding of the optical fiber. The velocity of the optical fiber as it is later unwound from the bobbin may be as high as several hundred meters per second. If any snags, uneven stresses, or other irregularities are present, they can cause the optical fiber to break.

One important manufacturing variable of the optical fiber is its outer diameter. Variation in the diameter can result from variation in either the diameter of the glass fiber or the thickness of the buffer layer, but more typically is due to the latter reason. Such variation in optical fiber diameter, if too great, can produce winding irregularities that can lead to breaking of the optical fiber as it is later unwound. Thus, for example, if the optical fiber in one layer is uniformly of one diameter, and then the optical fiber wound over it in the next layer is of a slightly larger diameter in one region, the large diameter in a portion of the second layer may result in overly high in-layer stresses and a "pop up" defect in that or a neighboring layer. Such a defect can result in snagging and breaking of the optical fiber as it is unwound from the bobbin.

One fiber break in a long optical fiber disrupts the communications through the optical fiber, which can lead to a disastrous and costly complete system failure. Even one out-of-tolerance diametral variation, over only a few centimeters of the length of an optical fiber that is many kilometers long, may therefore be unacceptable. It is therefore necessary in critical applications to inspect the diameter of the optical fiber to be certain that it meets tolerances over its entire length. In a production setting such an inspection is quite a demanding challenge, since a long length must be inspected.

In one possible approach, a length of optical fiber is progressively unwound from a source spool, transported past an inspection station, and then rewound onto a receiver spool. One candidate type of inspection station, which is now commercially available, is a laser scanner. A laser beam whose diameter is less than that of the optical fiber is rapidly scanned from side to side in a scanning pattern that is longer than the diameter of the optical fiber. A photocell behind the optical fiber measures the intensity of the light. As the laser beam first intercepts the optical fiber, the measured intensity drops, remains low as long as the laser beam intercepts the optical fiber, and then rises to the initial value when the laser beam no longer intercepts the optical fiber. A timer measures the length of time that the intensity is reduced, and from this time and the scanning speed the diameter of the optical fiber is calculated.

The laser scanning approach is operable when the optical fiber is stationary or moving slowly, but at higher translational speeds of several meters per second becomes unsatisfactory for several reasons. Scanning is typically accomplished by bouncing the laser beam against a rotating faceted mirror. The highest rotational rates of the mirror currently possible do not produce a sufficient scanning frequency to make measurements at the desired interval along a rapidly moving optical fiber as it moves past the measurement apparatus. The scan line travels across the moving optical fiber in a diagonal path, so that the diameter measurement is not at a single longitudinal location. Transverse vibration of the optical fiber can additionally interfere with the measurement. Moreover, the electronics cannot process the information at the required rates.

There is therefore a need for an improved approach for evaluating the diameter of a moving optical fiber to be certain that it is within preselected acceptable tolerance limits. The present invention fulfills this need, and further provides related advantages.

SUMMARY OF THE INVENTION

The present invention provides an apparatus and method for evaluating the diameter of an optical fiber or other object. It is particularly suitable for evaluating objects moving at a high speed. An optical fiber can therefore be rapidly screened along its entire length. The diametral evaluation is conducted across a true diameter of the optical fiber, not along a diagonal path, therefore yielding meaningful results as to local variations in diameter that can adversely affect the unwinding of the optical fiber from a canister. The evaluation time is quite short, so that evaluations can be conducted about every 50 microseconds or less. The diametral evaluation can be used either as a simple screening tool to identify lengths of the optical fiber that are outside preselected tolerances, or to determine a true diameter. The diametral measurement is made with high precision, and in a preferred embodiment can measure variations to within a few micrometers in an optical fiber of 250 micrometer diameter. The apparatus has no moving parts other than those of the fiber transport mechanism, and is highly reliable. It is also tolerant of small sideways vibrations in the object being measured.

In accordance with the invention, apparatus for evaluating the diameter of an object comprises a plurality of discrete light sensors arranged in a linear array to receive light from a common source; a light source that directs a beam of light into the sensors of the array; and means for determining the number of light sensors in the array that are affected by the interaction of the beam of light from the light source with an object placed between the light source and the array.

A stationary array of optical sensors, such as light-sensitive diodes, is positioned to receive a beam of light from a light source. The preferred approach is to backlight the object, with the object between the light source and the sensor array. Since the width of the array is typically much greater than the diameter of the object being measured, a lens is preferably provided to enlarge and direct the image of the object onto the array. The distribution of the intensity of light across the array of sensors provides a measure of the diameter of the optical fiber.

The distribution of the intensities is recorded at an instant in time, to provide a "snapshot" of the distribution of light intensity, and thence the diameter, at a single location along the length of the object. If the object is moving rapidly, successive distributions indicate the object's diameter at successive locations along its length. Since a typical array has at least 2000 individual optical sensors, the resolution of the diameter of an object whose shadow covers about one-half of the sensor array is on the order of 0.1 percent. This resolution is sufficient for evaluating the optical fiber diametral variation.

The diameter of the object is indicated by the number of sensors of the array that are affected. For example, in the preferred backlighting mode, the number of sensors in shadow is directly proportional to the diameter of the object.

The apparatus can be used either to calculate an absolute value of diameter, or as an acceptance testing device. In the latter use, for example, it may have been determined that, for a selected geometry, the number of sensors in shadow for a fiber of acceptable diameter is 550+/−2. The number of shadowed sensors may therefore range from 548 to 552. If the number is within that range, the diameter is acceptable; if the number is greater or lesser than that range, the diameter is unacceptable. The apparatus maintains a count of the number of shadowed sensors, either directly or by examining incremental changes at the edges of the shadow pattern. The apparatus can therefore operate very rapidly to judge diametral acceptability, without going through the mathematical manipulations to obtain an absolute diameter value.

The present approach thus provides an approach for assessing an object diameter very rapidly. It is therefore particularly useful for assessing the diameter of an optical fiber "on the fly" as the optical fiber is transported rapidly past the sensing apparatus. Long lengths of optical fiber can therefore be evaluated rapidly for out of tolerance conditions. Other features and advantages of the invention will be apparent from the following more detailed description of the invention, taken in conjunction with the accompanying drawings, which illustrate, by way of example, the principles of the invention.

BRIEF DESCRIPTION OF THE DRAWINGS

FIG. 1 is a side schematic view of a preferred embodiment of the measurement apparatus;

FIG. 2 is a side schematic view of a second embodiment of the measurement apparatus;

FIG. 3 is a block diagram of the data processing for the measurement apparatus;

FIG. 4 is a trace of an intensity distribution across the optical sensor array;

DETAILED DESCRIPTION OF THE INVENTION

Figure 5:
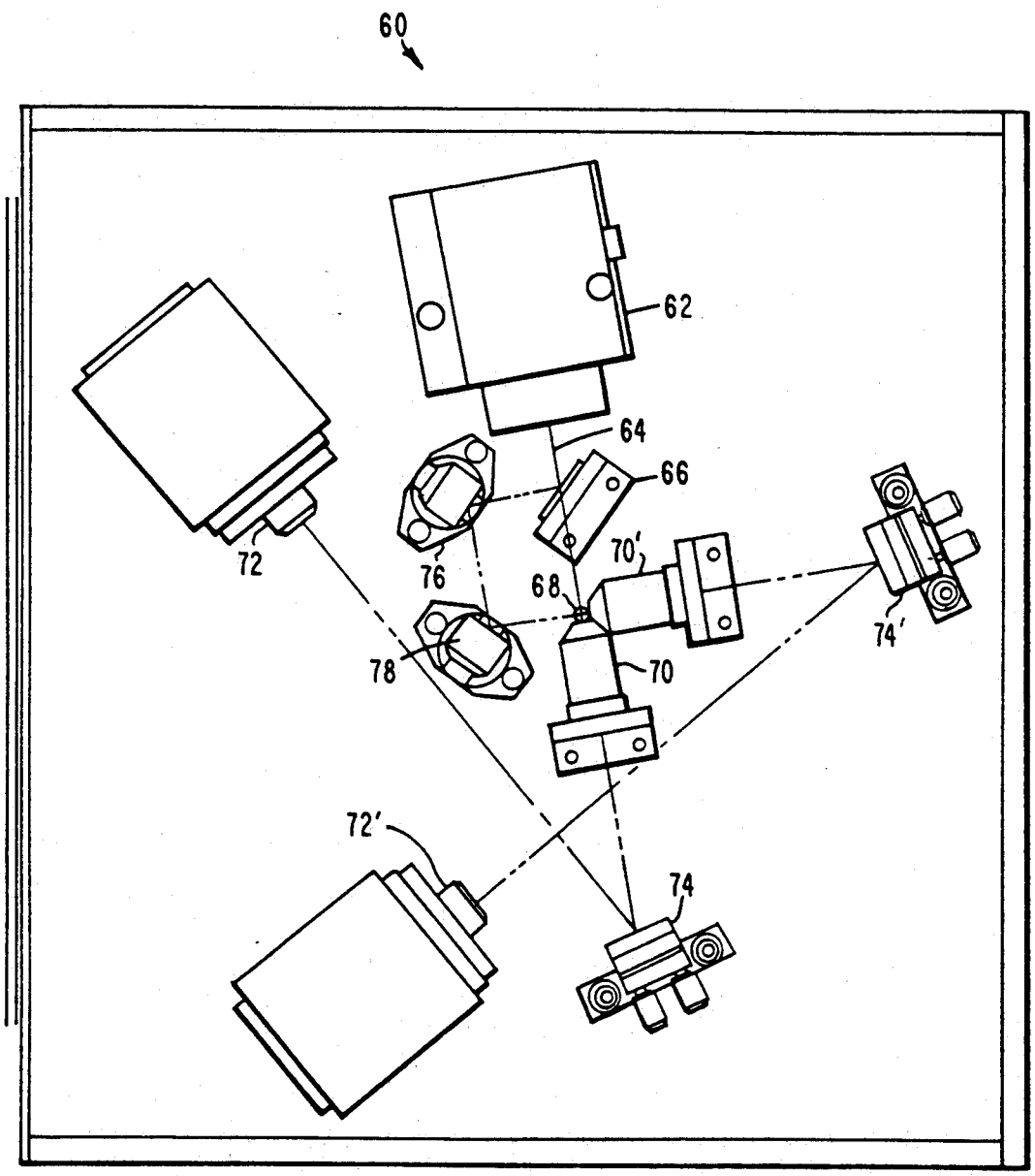
FIG. 5 is a plan view of a two-beam measurement apparatus for measuring the diameter of an optical fiber in orthogonal directions.

In accordance with the invention, apparatus for evaluating the diameter of an optical fiber comprises a plurality of discrete light sensors arranged in a linear array to receive light from a common source; a light source that directs a beam of light into the sensors of the array; a lens between the light source and the array of light sensors to direct onto the array of light sensors an enlarged image of an optical fiber placed between the light source and the array; and means for determining the number of light sensors in the array that lie within the shadow of the optical fiber on the array of light sensors.

Referring to FIG. 1, an apparatus 20 includes a plurality of light sensors 22 arranged in a linear array 24. Each sensor 22 produces a signal indicative of the intensity of the light falling thereon, as indicated schematically with a signal line 26 extending from each sensor 22. A light source 28 includes a laser 30 that emits a light beam 34 that is broader than the diameter of an optical fiber 36 under analysis. Other light sources could equivalently be used, such as a bulb directed against one side of a diffuse white screen with the light beam being emitted from the other side.

The optical fiber 36 is positioned between the light source 28 and the sensor array 24. In the illustrated view, the elongated direction of the optical fiber 36 is perpendicular to the plane of the page. In FIGS. 1 and 2, the diameter of the optical fiber 36 is exaggerated for illustrative purposes. In practice, the diameter of the optical fiber 36 is about 250 micrometers (about 0.010 inches), while the length of the linear array 24 is about 1 inch. To make use of a good portion of the full length of the array 24, a lens 38 is placed between the optical fiber 36 and the array 24, to enlarge the image of the optical fiber 36 and direct it to the plane of the array 24. Preferably, the lens 38 is selected and positioned so that the imaged diameter of the optical fiber 38 is enlarged to about one-half of the length of the linear array 24.

The array 24 is preferably a Reticon model LC 1901 linear diode array manufactured by EG&G, Sunnyvale, Calif. This diode array contains 2048 active diodes in a linear array about 1 inch long. The geometry of the apparatus 20 and 40 is preferably adjusted so that the shadow of the optical fiber 36 covers about one-half of the length of the array 24, or about 1000 diodes. The resolution of the apparatus is therefore about 1/1000 or 0.1 percent of the optical fiber diameter. This resolution is sufficient for assessments of suitability of an optical fiber for winding onto a bobbin to make a canister.

FIG. 2 illustrates another embodiment as an apparatus 40, which is similar to the apparatus 20 except as follows. A collimated light beam 44 from a source 46 is directed through a lens 48 that focuses the beam 44 to a point 50. That point source 50 illuminates the optical fiber 36, casting a shadow upon the arrays 24'. Also, in the FIG. 2 embodiment two short arrays 24' are used, with each array having about 100 diodes. (Equivalently, the two short arrays 24' may be viewed as segments of the longer array 24, because the longer array 24 may be operated in the same manner as two short arrays 24', ignoring the central sensors 22 that are always in shadow.) The arrays 24' are positioned to overlap the expected positions of the extrema of the shadow of the optical fiber 36. The use of these arrays 24' will be described subsequently.

The electronics for assessing the optical fiber diameter from the signals on the lines 26 produced by either apparatus 20 or 40 is illustrated in FIG. 3. The signals on the lines 26 are received by a frame grabber 52, which controllably selects a set of values of all of the lines 26 at a moment in time (sometimes termed pixels in the art) to form a serial word. FIG. 4 is a graphical presentation of such a word, with the intensity of the signal from each sensors 22 as a function of position of the sensor along the array 24. The shadow of the optical fiber 36 can be seen in the central portion of the figure.

Although the graph of FIG. 4 is of use in visualizing the shadow of the optical fiber 26 and thence its diameter, this graph is not normally prepared because it would take too long to produce. Instead, the serial word used to form the graph is sent to a gate circuit 54 that compares the value of each of the sensor signals with a threshold value provided to the circuit 54. If the magnitude of the individual signal from a line 26 is less than the threshold value, that particular sensor is judged to be within the shadow of the optical fiber 36. The threshold value and its use in determining the optical fiber diameter is depicted in FIG. 4, but, again, that is for illustration only. In high speed operation, the output of the gate circuit 54 is a serial word having the same number of bits as that provided from the frame grabber 52 to the gate 54, but having only 1s or 0s, indicating a level above the threshold or below the threshold, respectively.

A programmable counter 56 counts the number of pixels or bits of the serial word received from the gate circuit 54 that are below the threshold, indicating that they are in shadow. This number is compared with limits provided to the counter 56, as to the number of bits in shadow that are within preselected limits. If the number is within the limits, then no signal is made. If the number is outside the limits, then an "out of limit" flag can be set to indicate the fact that the diameter of the optical fiber is not within the required limits. In the example discussed earlier with the permitted diametral variation is from 448 to 552 pixels within the shadow, fewer than 448 or more than 552 pixels in shadow would generate an out of limit flag. Because digital electronics performs counting operations rapidly, the necessary counting can be performed within milliseconds.

An even faster approach is to examine only the values at the ends of the shadowed portion of the array, using the gate 54 and counter 56 in another way. Most of the sensors 22 in the central portion of the array 24 will remain in shadow and therefore below the threshold during normal operation. Sensors at the edges of the shadow may vary from below the threshold to above the threshold for either of two reasons, because the optical fiber moves from side to side slightly or because the diameter varies. The required comparison is performed by the gate 54. If the number of sensors 22 below the threshold at one end of the array is reduced by five and at the other end increased by five from one frame to the next, the diameter remains constant and the variation is due to a sideways vibration. On the other hand, if the number of sensors 22 below the threshold at one end of the array is reduced by five and at the other end increased by only three from one frame to the next, then it can be concluded that the optical fiber diameter has been reduced by an amount corresponding to two of the optical sensors 22. This value is substracted from the total number of sensors in shadow in the preceding frame, and the result compared to the limits by the counter 56. If the result is out of limits, a flag is generated.

A hardware implementation of this technique is conveniently constructed by using two shorter arrays 24' that are positioned to cover only the opposing edges of the shadow of the optical fiber 36. Because the optical fiber is transversely stabilized during movement through the apparatus 20 or 40 (as will be discussed subsequently in more detail), short arrays can be positioned to overlap the expected shadow/non shadow transition region without concern that the transition will wander from the sensor field of view. The two sensor arrays 24' of FIG. 2 illustrate this construction. The short arrays 24' are less expensive than a longer array, and counting operations can be done faster.

The frame grabber, gate circuit, and counter are available commercially in the digital video analysis system available from EPIX, Inc., Northbrook, Ill.

It is usually desirable to evaluate two orthogonal (perpendicular) diameters of an optical fiber simultaneously to assess diameter variations in both directions, because otherwise there would be no indication of an out of limits condition in the direction parallel to the light beam of FIGS. 1 and 2. An apparatus 60 to perform simultaneous evaluations of diameter variations along two diameters is illustrated in FIG. 5, with the light ray paths also indicted. A single light source 62 (or, equivalently, two light sources) produces a light beam 64 that is directed to a beam splitter 66. One part of the beam passes through the beam splitter 66 to an optical fiber 68 and is imaged by a lens 70 onto a linear array 72, in this case being first reflected by a plane mirror 74 because of packaging space limitations. The other part of the beam 64 is reflected by the beam splitter 66, reflected off two planar mirrors 76 and 78 through 180°, passed by the optical fiber 68 in a direction perpendicular to the other portion of the beam, and imaged by a lens 70' onto a linear array 72', again after reflection by a planar mirror 74'. Each of the measurement systems operates as described previously.

Figure 6:
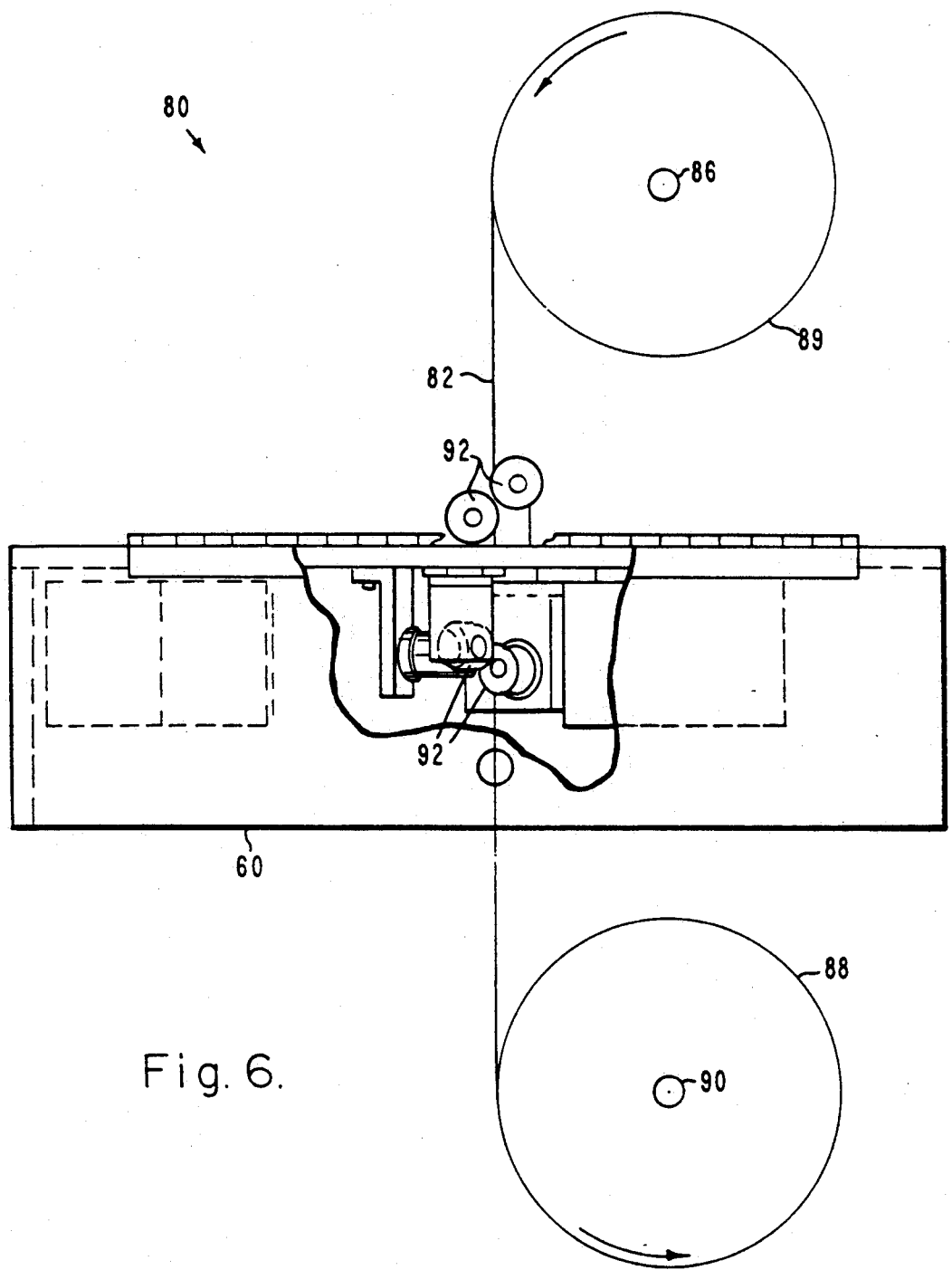
FIG. 6 is a side view of a measurement apparatus and optical fiber transport.

In the most preferred application of the invention, the optical fiber is transported past the diametral sensing device by an optical fiber transport mechanism 80, illustrated in FIG. 6. An optical fiber 82 is furnished on a supply spool 84, which is mounted to turn on an axle 86. A receiver spool 88 is mounted to turn on an axle 90. The spools 84 and 88 are positioned so that the optical fiber 82 passes through the measurement device, here illustrated as the apparatus 60 in side view. Preferably, pairs of rollers 92 are provided to barely contact the optical fiber 82 on either side of the apparatus 60, to stabilize it against transverse vibrations. (Equivalently, other means to stabilize the optical fiber against transverse vibrations may be employed.) As noted previously, the apparatus 60 is relatively insensitive to lateral vibrations that move the optical fiber from side to side, thereby shifting the location of the shadow on the optical sensor array. However, movement of the optical fiber toward and away from the array changes its focus on the array, and a degree of stabilization is therefore desired. Transverse stabilization is also desirable where short arrays 24' are used. The rollers 92 are adjusted to barely contact the optical fiber as it moves, damping out vibration but not wearing against the optical fiber.

An apparatus of the preferred construction as described herein has been built and tested. Using a linear array about 1 inch long with 2048 optical sensors and an optical system geometry such that the total width of the optical fiber is imaged on about one-half of the total length of the array, the resolution of the apparatus to diametral variation is about 0.1 percent of the diameter of the optical fiber. An out of limit condition flag is generated in about 50 microseconds, where appropriate. For an optical fiber transport speed of 10 meters per second, a diametral evaluation can be conducted using the apparatus of the invention about every ½ millimeter along the length of the optical fiber. By comparison, for a faceted mirror system having 10 facets and rotating at its optimal speed, diametral measurements can be attained only about every 20 millimeters. With the apparatus of the present invention, it is unlikely that unacceptable diameter variations could pass through the apparatus undetected, while they could easily escape detection with the rotating mirror apparatus. The apparatus of the invention therefore achieves performance that is superior in the context of use, the determination of diametral variations along a moving optical fiber.

Although particular embodiments of the invention have been described in detail for purposes of illustration, various modifications may be made without departing from the spirit and scope of the invention. Accordingly, the invention is not to be limited except as by the appended claims.

What is claimed is:

1. Apparatus for evaluating the diameter of an optical fiber moving from a supply spool onto a receiver spool, comprising:
    a plurality of discrete light sensors arranged in a linear array to receive light from a light source means;
    light source means for directing a highly collimated beam of light onto the sensors of the array;
    stabilizer means located between the supply and receiver spools for simultaneously contacting opposite sides of the moving optical fiber to stabilize the optical fiber against transverse vibrations;
    a single lens positioned between the light source means and the array of light sensors to direct onto the array of light sensors an enlarged image of an optical fiber moving between the light source and the array;
    means for determining the number of light sensors in the array that lie within the shadow of the optical fiber on the array of light sensors, wherein said means for determining comprises:
    a frame grabber that records the output signal of each of the light sensors of the array at an instant in time;
    a gate circuit that determines whether the signal of a light sensor is below a threshold value; and
    means for counting the number of sensors of the array that have an intensity below the threshold value.

2. The apparatus of claim 1, wherein the linear array is provided as two segments.

3. The apparatus of claim 1, wherein the lens is disposed between the optical fiber and the array of light sensors.

4. The apparatus of claim 1, wherein the lens is disposed between the light source means and the optical fiber.

5. The apparatus of claim 1, further including further apparatus to evaluate a second diameter of the optical fiber, including
    a second plurality of discrete light sensors arranged in a second linear array to receive light from a second light source;
    second light source means for directing a second highly collimated beam of light onto the sensors of the second array; and
    a second lens positioned between the second light source means and the second array of light sensors to direct onto the second array of light sensors an enlarged image of an optical fiber placed between the second light source means and the second array, wherein
    the second beam of light is not parallel to the beam of light.

6. The apparatus of claim 5, wherein the second light source means and the light source means originate at a common light emitter.

* * * * *